United States Patent
Wagner et al.

[11] Patent Number: 6,052,642
[45] Date of Patent: Apr. 18, 2000

[54] PROCESS AND DEVICE FOR GENERATING AN ACCELERATION SIGNAL

[75] Inventors: Jochen Wagner; Helmut Wiss, both of Moeglingen, Germany

[73] Assignee: Robert Bosch GmbH, Stuttgart, Germany

[21] Appl. No.: 08/933,873

[22] Filed: Sep. 19, 1997

[30] Foreign Application Priority Data

Sep. 19, 1996 [DE] Germany .................. 196 38 278

[51] Int. Cl.[7] .................. G01P 3/44; G01P 15/00
[52] U.S. Cl. .................. 701/70
[58] Field of Search .................. 701/70; 702/145, 702/147, 148, 96; 324/162; 364/153; 303/183

[56] References Cited

U.S. PATENT DOCUMENTS

| | | | |
|---|---|---|---|
| 3,833,270 | 9/1974 | Gotz et al. | 303/154 |
| 4,670,852 | 6/1987 | Masaki et al. | 702/146 |
| 4,718,013 | 1/1988 | Jun | 701/76 |
| 5,012,417 | 4/1991 | Watanabe et al. | 701/71 |
| 5,099,443 | 3/1992 | Higashimata et al. | 702/141 |
| 5,123,714 | 6/1992 | Mori | 303/199 |
| 5,583,773 | 12/1996 | Pfau | 701/78 |

FOREIGN PATENT DOCUMENTS

WO90/11213  10/1990  WIPO .

*Primary Examiner*—Michael J. Zanelli
*Attorney, Agent, or Firm*—Kenyon & Kenyon

[57] ABSTRACT

An acceleration signal is generated in a motor vehicle having acceleration and deceleration states. The signal generated is used in a vehicle control system. A first value, representing vehicle acceleration, is initially determined as a function of at least one value acquired by a sensor. Furthermore, a second value representing the instantaneous acceleration and deceleration state of the vehicle is determined. The magnitude of the first value determined is limited as a function of the second value determined. Then, the signal representing the vehicle acceleration is generated as a function of the limited first value.

10 Claims, 4 Drawing Sheets

PROCESS AND DEVICE FOR GENERATING AN ACCELERATION SIGNAL

BACKGROUND INFORMATION

Knowing the longitudinal acceleration of a vehicle as accurately as possible is important for a plurality of vehicle control systems, in particular for systems designed for optimizing the travel dynamics of the vehicle. Such systems are, for example, anti-lock or traction control systems, designed to counter any tendency to lock-up or excessive drive slippage. Dynamics control systems are also known for controlling the transversal movements or yaw of the vehicle. In addition, the vehicle acceleration can also be used for chassis or steering control systems.

FIG. 1, illustrating the conventional method for determining acceleration, is explained briefly below. In general, the longitudinal speed $V_1$ of the vehicle is measured for this purpose (block 101), for example, in the known manner by analyzing the wheel speed values acquired by sensors. The longitudinal acceleration $a_1$ of the vehicle is obtained from the longitudinal speed $V_1$ by differentiation or, in the case of discrete time intervals, subtraction (Block 102). Since signal $V_1$ representing the longitudinal speed of the vehicle may be affected by interference, the acceleration signal $a_1$ thus obtained can be filtered in a first- or second-order filter 103. The output signal $a_{1f}$ present at filter 103 represents then the corrected vehicle acceleration, which is sent to one or a plurality of the aforementioned vehicle control system(s) 104. Correction filtering 103 must be designed so that even strong interference affecting signal $V_1$ and thus signal $a_1$ is removed; however, strong filtering can also mean a strong phase shift of signal $a_{1F}$ in relation to signal $a_1$, which may cause problems in the subsequent processing in block 104.

Furthermore, it is also known from the related art (e.g., from WO 90/11213), that the instantaneous braking torque, in particular the changes in the braking torque, can be determined, for example, from the estimated wheel brake pressures.

An object of the present invention is to generate an acceleration signal that is as free of distortion as possible in a simple manner.

SUMMARY OF THE INVENTION

The present invention provides the generation of an motor vehicle acceleration signal where the motor vehicle has acceleration and deceleration states. The signal generated according to the present invention is used in a vehicle control system. According to the present invention, a first value representing the change in the vehicle acceleration is first determined as the function of at least one value acquired by a sensor. Furthermore, a second value representing the instantaneous acceleration and deceleration state of the vehicle is determined. The essence of the present invention relates to the fact that the magnitude of the first value determined is limited depending on the second value determined. The signal representing the vehicle acceleration is then determined as a function of the limited first value.

The present invention offers the advantage that stronger signal interference is detected already at the input due to the limitation according to the present invention when generating the acceleration signal. Then the subsequent filtering, as described above, of the signal limited according to the present invention does not need to counter strong interference by a suitably strong filtering, which in turn would result in the aforementioned high phase shift. The limitation according to the present invention allows an acceleration signal having no more major interference to be generated.

In an advantageous embodiment of the present invention, a third value representing the longitudinal speed of the vehicle is determined and differentiated for determining the first value representing the vehicle acceleration. The third value can be determined as a function of the rotation of at least one vehicle wheel speed acquired by a sensor.

In a particularly advantageous embodiment, the present invention is based on the fact that a change in acceleration in the case of deceleration (negative acceleration) is mainly the effect of a corresponding change in the braking torque. For this reason, in this embodiment, it is proposed that the second value, which basically determines the limitation according to the present invention, shall represent the change in the braking torque acting on the vehicle. Dealing with the change in torque in the limitation according to the present invention offers the advantage that it is independent of the absolute braking torque determination, which is in general difficult.

In another special embodiment of the present invention, the first value (change in acceleration) is limited downward to small values (change to greater vehicle decelerations). This limitation takes place as a function of the second value determined (change in braking torque).

Alternatively or in addition, it can also be provided that, when the second value determined represents a reduction in the braking torque, the first value (change in acceleration) is limited upward to high values (change to lower vehicle decelerations). This limitation also takes place as a function of the second value (change in braking torque) determined.

DETAILED DESCRIPTION

The present invention is based on the fact that a change in acceleration $\Delta a_1$ in the case of deceleration (negative acceleration) is mainly the effect of a corresponding change in the braking torque $\Delta M_{Br}$. The relationship is given by the equation acceleration=torque/(m*R), where m is the vehicle mass, and R is the wheel radius. In the case of deceleration, $a_v = a_1$ (negative acceleration $a_a$), we have:

$a_v = -a_1 = M_{Br}/(M*R)$, where $M_{Br}$ is the braking torque. Considering the change in acceleration as the difference between the acceleration values at two different points in time $t_1$ and $t_2$, $\Delta a_1 = a_1(t_2) - a_1(t_1)$, which yields the change in acceleration $\Delta a_1$ or change in deceleration $\Delta a_v$, $\Delta a_v = -\Delta a_1 = \Delta M_{Br}/(m*R)$.

If the change in acceleration $\Delta a_1$ or the change in deceleration $\Delta a_v$ does not correspond to the change in the braking torque $\Delta M_{Br}$, then this change in acceleration is not plausible and is considered interference. Thus the change in braking torque $\Delta M_{Br}$ determines an allowable range for the change in acceleration. Since, however, not all change in acceleration is caused by a change in braking torque, the allowable range has a minimum positive value $Z_{min,pos}$ and a minimum negative value $Z_{min,neg}$. In this embodiment, dealing with the limitation of the acceleration values, these values $Z_{min,pos}$ and $Z_{min,neg}$ are fixed set values determined so that changes in acceleration caused, for example, by an increase in the engine torque due, for example, to the driver actuating the accelerator pedal or to a slope, are allowed.

Figure 1:
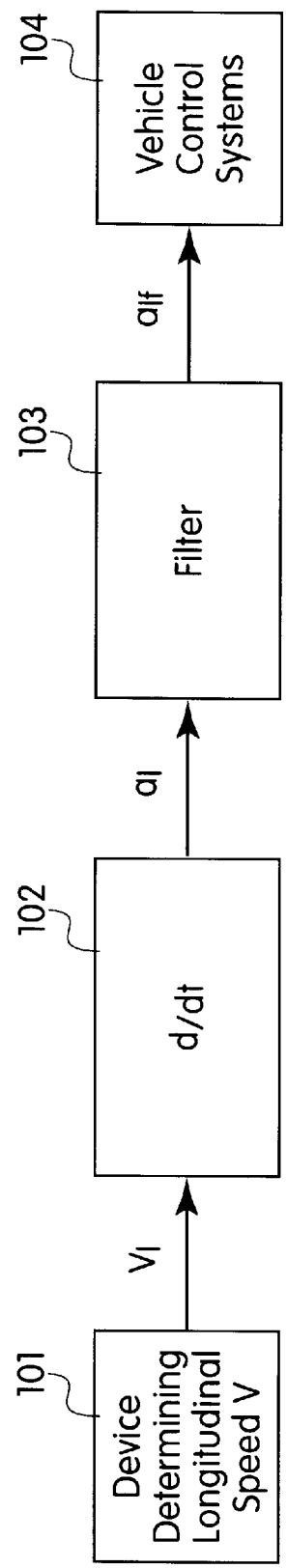
FIG. 1 shows a block diagram of a known system.
Figure 2:
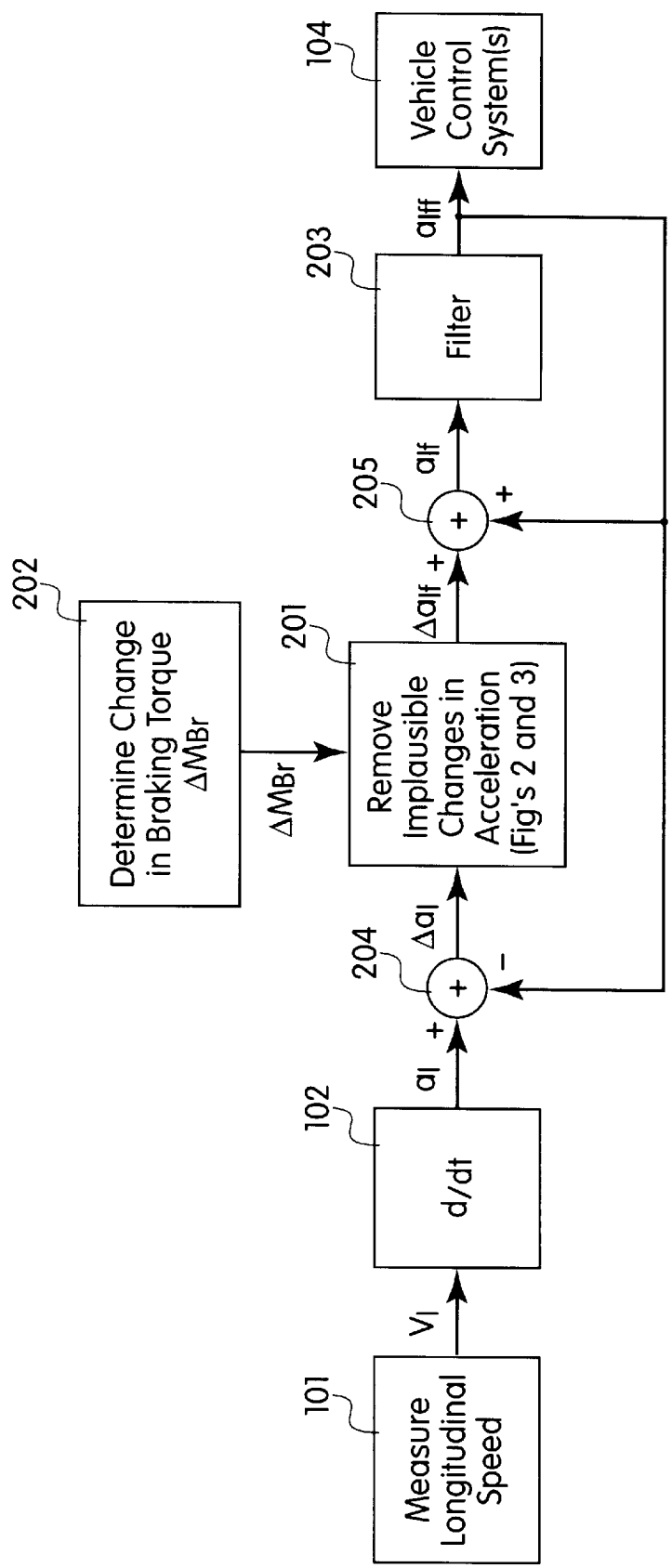
FIG. 2 shows a block diagram of the system according to the present invention.

Whereas FIG. 1 was explained in describing the related art, FIG. 2 shows the generation of the acceleration signal with reference to an embodiment of the present invention.

As described with reference to FIG. 1, 101 denotes, in FIG. 2, the measurement of the longitudinal speed $V_1$ of the vehicle. This speed can be measured, for example, in a known manner by analyzing the wheel rotation speeds acquired by sensors. Differentiating the longitudinal speed $V_1$ of the vehicle or computing the difference in the case of discrete time intervals yields the longitudinal acceleration $a_1$ of the vehicle (block 102). In the other blocks 204, 201, and 205, to be described later, signal $a_1$ is further processed to yield signal $a_{1f}$ to be filtered in block 203, yielding acceleration signal $a_{1ff}$. Filter 203, like filter 103 described in FIG. 1, can be a first- or second-order filter; filtering 103 must be substantially stronger compared to filtering 203.

Output signal $a_{1ff}$ appearing at filter 203 represents the corrected vehicle acceleration, which is sent to one or more of the aforementioned vehicle control system(s) 104.

At node 204, the instantaneous value $a_{1ff}$ of the longitudinal acceleration $a_{1ff}$ of the vehicle is first subtracted from the differentiated longitudinal speed $a_1$ of the vehicle (output signal of block 102), which may be affected by interference. The value $\Delta a_1$ thus obtained corresponds to the change in the longitudinal acceleration $\Delta a_1$ of the vehicle (affected by interference). This change in acceleration $\Delta a_1$ is now limited in block 201, as mentioned at the beginning of the description of this embodiment in order to remove implausible changes in acceleration, i.e., interference signals.

For this purpose, the change $\Delta M_{Br}$ in braking torque, determined in block 202 in a manner known per se, for example, by estimating the wheel brake pressures, is sent to block 201.

The function of block 201 will be described in detail below with reference to FIGS. 3 and 4. For this purpose, it will be shown, with reference to FIG. 3, how the allowable range for the change in acceleration is determined, while FIG. 4 illustrates the formation of the output signal of block 201.

Figure 3:
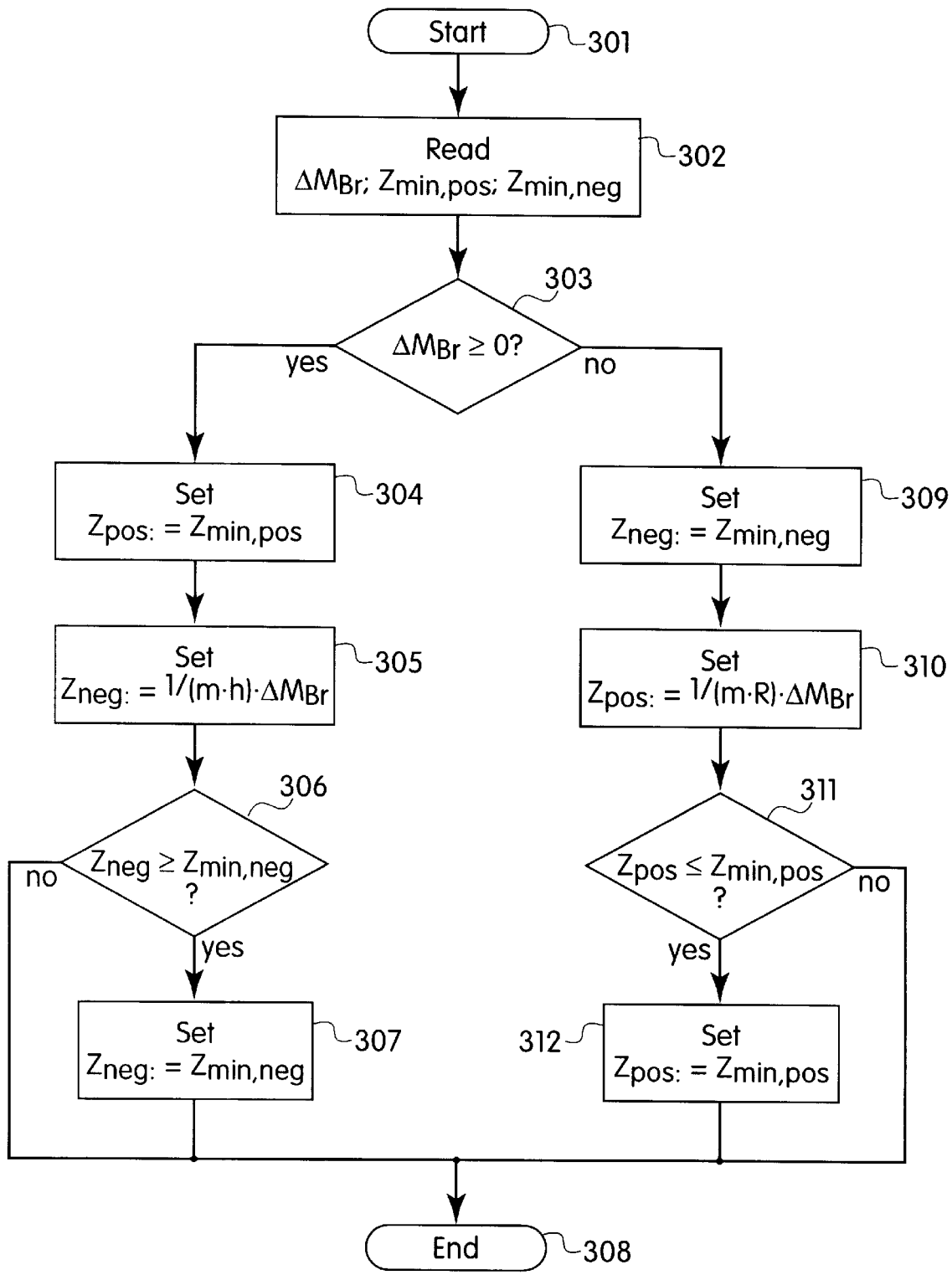
FIG. 3 shows a first flow chart illustrating the functioning of blocks of FIG. 2.
Figure 4:
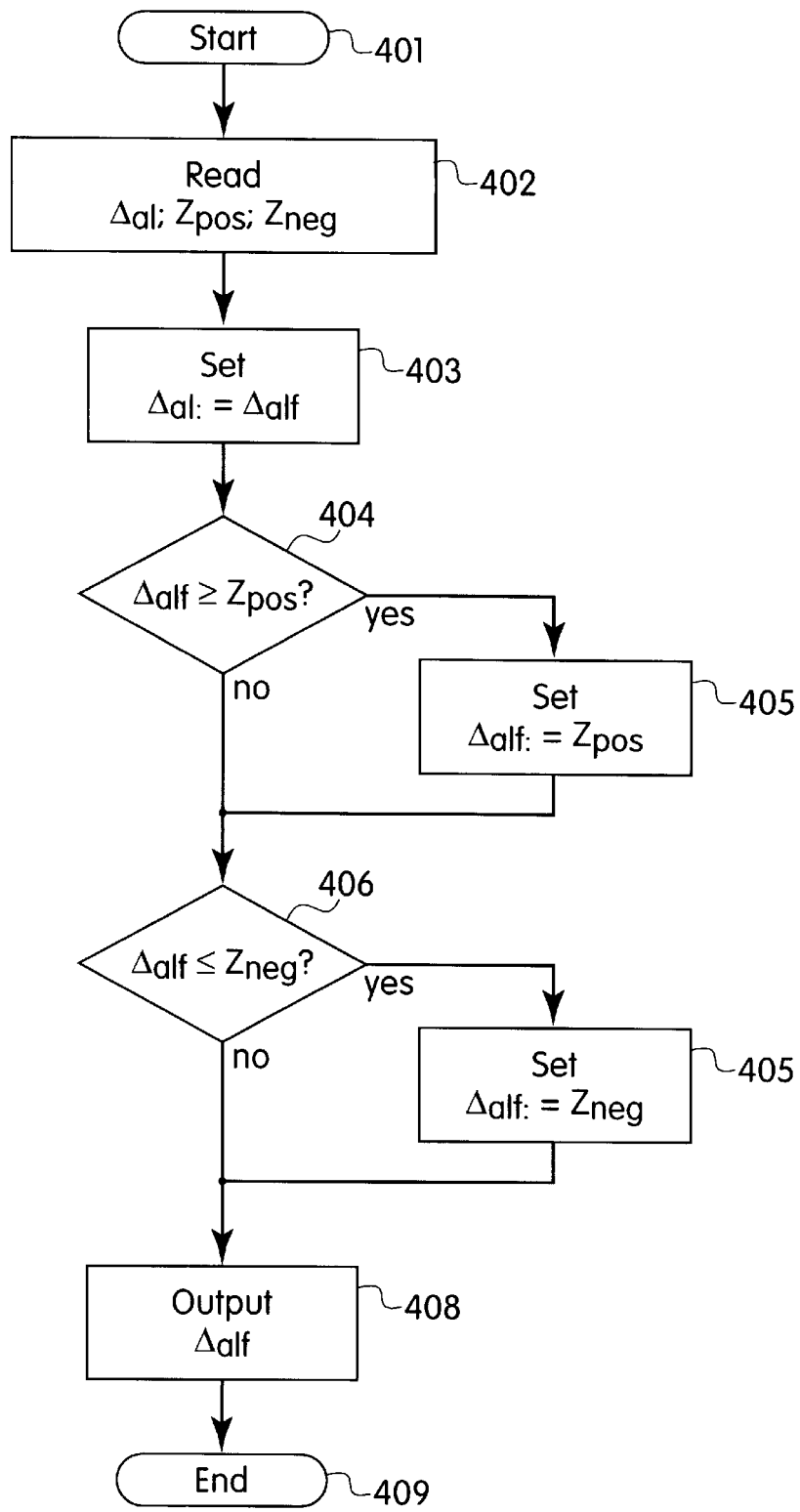
FIG. 4 shows a second flow chart illustrating the functioning of blocks of FIG. 2.

After start step 301, shown in FIG. 3, the instantaneous change in braking torque and the aforementioned minimum positive/minimum negative values $Z_{min,pos}/Z_{min,neg}$ are determined first in step 302. As mentioned above, in this embodiment, these values $Z_{min,pos}$ and $Z_{min,neg}$ are fixed set values, since this embodiment is mainly concerned with the limitation of the acceleration values.

In step 303 it is inquired whether the change $\Delta M_{Br}$ in the braking torque is positive or negative (i.e., greater than, less than, or equal to, zero).

If the change in the braking torque is positive or zero, this means that an increase or no change in braking torque $M_{Br}$ is taking place. In this case, a plausible change in the acceleration $\Delta a_1$ may not drop below a lower (negative) limit $Z_{neg}$ selected according to the change in braking torque. This means that a change in deceleration, basically caused by the change in braking torque, may not exceed a certain limit. This limit is selected in step 305 as $$Z_{neg} := \Delta M_{Br}/(m^*R)$$

with m denoting the vehicle mass and R denoting the wheel radius. The upper limit $Z_{pos}$ is set to the minimum positive value $Z_{min,pos}$ in step 304 in order to allow increases in acceleration (decreases in deceleration), caused, for example, by an increase in the forward driving torque and/or travel on a downward slope, despite a positive change in the braking torque.

In step 306 it is inquired whether the lower (negative) limit $Z_{min}$ determined is greater than the minimum negative value $Z_{min,neg}$. If this is the case, for example, due to a very small change in the braking torque, the lower negative limit $Z_{neg}$ is set to the minimum negative value $Z_{min,neg}$ in step 307 in order to allow a decrease in acceleration due to a decrease in engine torque and/or to travel on an upward slope.

If it is established in step 303 that the change in braking torque is negative, i.e., less than zero, this means that a decrease in braking torque $M_{Br}$ is taking place. In this case, a plausible change in acceleration $\Delta a_1$ may not exceed an upper (positive) limit $Z_{pos}$ selected according to the change in braking torque. This means that a change in deceleration, basically caused by the change in braking torque, may not drop below a certain lower limit. This limit is selected in step 310 as $$Z_{pos} := \Delta M_{Br}/(m^*R)$$

with m denoting the vehicle mass and R denoting the wheel radius. The lower limit $Z_{neg}$ is set to the minimum negative value $Z_{min,neg}$ in step 309 in order to allow decreases in acceleration (increases in deceleration), caused, for example, by a decrease in the forward driving torque and/or travel on an upward slope, despite a negative change in the braking torque.

In step 311 it is inquired whether the upper (positive) limit $Z_{pos}$ determined is smaller than the minimum negative value $Z_{min,pos}$. If this is the case, for example, due to a very small change in the braking torque, the lower positive limit $Z_{pos}$ is set to the minimum positive value $Z_{min,pos}$ in step 312 in order to allow an increase in acceleration due to an increase in engine torque and/or to travel on a downward slope.

After end step 308, the sequence shown in FIG. 3 is run again.

The actual limitation of signal $\Delta a_1$ is accomplished as illustrated in FIG. 4.

After start step 401, the instantaneous value of $\Delta a_1$ of the change in acceleration and the limits formed $Z_{neg}$ and $Z_{pos}$ (see FIG. 3) are read in step 402.

In step 403 the change in acceleration $\Delta a_1$ is set to $\Delta a_{1f}$ in order to check in step 404 whether $\Delta a_{1f}(=\Delta a_1)$ exceeds the positive limit value $Z_{pos}$. If this is the case, this means that the longitudinal speed of the vehicle $V_1$, the acceleration $a_1$ derived therefrom, and the change in acceleration $\Delta a_1$ show an implausible increase in acceleration. In this case, the change in acceleration $\Delta a_1$ is limited to the positive limit $Z_{pos}$ in step 405. Signal $\Delta a_{1f}$ is set to the positive limit $Z_{pos}$ for this purpose.

If it is established in step 404 that $\Delta a_{1f}(=\Delta a_1)$ does not exceed the positive limit $Z_{pos}$, this means that the longitudinal speed of the vehicle $V_1$, the acceleration $a_1$ derived therefrom, and the change in acceleration $\Delta a_1$ show a plausible increase in acceleration.

Then it is checked in step 406 whether $\Delta a_{1f}(=\Delta a_1)$ is less than the negative limit $Z_{neg}$. If this is the case, this means that the longitudinal speed of the vehicle $V_1$, the acceleration $a_1$ derived therefrom, and the change in acceleration $\Delta a_1$ show an implausible decrease in acceleration (increase in deceleration). In this case the change in acceleration $\Delta a_1$ is limited to the negative limit $Z_{neg}$ in step 407. Signal $\Delta a_{1f}$ is set to the negative limit $Z_{neg}$ for this purpose.

If it is determined in steps 404 and 406 that the change in acceleration $\Delta a_1$ is within the plausible range, no limitation takes place in block 201.

After end step 409, the sequence shown in FIG. 4 is repeated.

The implausible acceleration change values are thus filtered out from signal $\Delta a_{1f}$ present at the output of block 201. If this change signal $\Delta a_{1f}$ is superimposed again on the currently determined acceleration $a_{1f}$ in gate 205, a new acceleration value $a_{1f}$ is obtained, which can be filtered in filter 203 to remove minor interference.

Thus in block 201 the major interference is filtered out through the formation of an allowable range ($Z_{neg}$; $Z_{pos}$) according to the present invention. Therefore, the subsequent filtering 203 does not have to counter strong interference with suitably strong filter characteristics, which would result in the aforementioned high phase shift.

Dealing with the change in torque instead of the torque for the allowable range has the advantage that the it is independent of the more difficult absolute moment determination.

What is claimed is:

1. A process for generating a signal representing an acceleration of a motor vehicle for a vehicle control system, the vehicle having acceleration and deceleration states, comprising the steps of:
   determining a first value representing a change in the vehicle acceleration as a function of at least one sensor output value;
   determining a second value representing an instantaneous acceleration and deceleration state of the vehicle;
   limiting the determined first value as a function of the determined second value; and
   generating the signal representing the vehicle acceleration as a function of the limited first value.

2. The process according to claim 1, further comprising the step of determining and differentiating a third value representing a longitudinal speed of the vehicle to determine the first value.

3. The process according to claim 2, wherein the third value is determined as a function of at least one vehicle wheel rotational speed acquired by a sensor.

4. The process according to claim 1, wherein the second value represents a change in a braking torque acting upon the vehicle.

5. The process according to claim 4, wherein the first value is limited downward to reflect a greater vehicle deceleration if the determined second value indicates an increase in the braking torque.

6. The process according to claim 4, wherein the first value is limited upward to reflect a smaller vehicle deceleration if the determined second value indicates a decrease in the braking torque.

7. A device for generating a signal representing an acceleration of a motor vehicle for a vehicle control system, the vehicle having acceleration and deceleration states, comprising:
   first means for determining a first value representing a change in the vehicle acceleration as a function of at least one sensor output value;
   second means for determining a second value representing an instantaneous acceleration and deceleration state of the vehicle;
   means for limiting the determined first value as a function of the determined second value; and
   means for generating the signal representing the vehicle acceleration as a function of the limited first value.

8. The device according to claim 7, wherein the second value represents a change in a braking torque acting upon the vehicle.

9. The device according to claim 8, wherein the first value is limited downward to reflect a greater vehicle deceleration if the determined second value indicates an increase in the braking torque.

10. The device according to claim 8, wherein the first value is limited upward to reflect a smaller vehicle deceleration if the determined second value indicates a decrease in the braking torque.

* * * * *